(12) United States Patent
Kim et al.

(10) Patent No.: US 10,269,337 B2
(45) Date of Patent: *Apr. 23, 2019

(54) SOUND ABSORBING AND INSULATING MATERIAL WITH IMPROVED HEAT RESISTANCE AND MOLDABILITY AND METHOD FOR MANUFACTURING THE SAME

(71) Applicant: Hyundai Motor Company, Seoul (KR)

(72) Inventors: Keun Young Kim, Gyeonggi-Do (KR);
Kie Youn Jeong, Gyeonggi-do (KR);
Bong Hyun Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 310 days.

This patent is subject to a terminal disclaimer.

(21) Appl. No.: 15/185,857

(22) Filed: Jun. 17, 2016

(65) Prior Publication Data

US 2016/0300561 A1 Oct. 13, 2016

Related U.S. Application Data

(63) Continuation of application No. PCT/KR2014/002477, filed on Mar. 25, 2014.

(30) Foreign Application Priority Data

Dec. 19, 2013 (KR) ........................ 10-2013-0159411

(51) Int. Cl.
*B32B 5/02* (2006.01)
*B32B 7/12* (2006.01)
(Continued)

(52) U.S. Cl.
CPC ............ *G10K 11/168* (2013.01); *B29B 11/12* (2013.01); *B32B 5/022* (2013.01); *B32B 7/12* (2013.01);
(Continued)

(58) Field of Classification Search
CPC .................. G10K 11/168; B29B 11/12; B29B 2105/0854; B29B 2995/0002;
(Continued)

(56) References Cited

U.S. PATENT DOCUMENTS 5,923,002 A * 7/1999 McGrath ................... B32B 5/26
181/290
7,137,477 B2 * 11/2006 Keller .................. G10K 11/162
181/286

(Continued)

FOREIGN PATENT DOCUMENTS

EP 1022375 A1 7/2000
EP 1659382 A1 5/2006
(Continued)

OTHER PUBLICATIONS

International Search Report—PCT/KR2014/002477, dated May 15, 2014.
(Continued)

*Primary Examiner* — Forrest M Phillips
(74) *Attorney, Agent, or Firm* — Mintz Levin Cohn Ferris Glovsky and Popeo, P.C.; Peter F. Corless

(57) ABSTRACT

Disclosed are a sound absorbing and insulating material with improved heat resistance and moldability and a method for manufacturing the same. The sound absorbing and insulating material includes a heat-resistant material, as a surface layer, prepared by impregnating a binder into a nonwoven fabric formed of a heat-resistant fiber and a base layer formed of a conventional sound absorbing and insulating material and the surface layer is stacked on one side of the base layer. The sound absorbing and insulating material of the present invention can have improved sound-absorbing property, flame retardancy, heat-insulating property and heat resistance as compared to the conventional sound absorbing and insulating material, is applicable to parts maintained at (Continued)

high temperatures of 200° C. or greater due to the surface layer and is moldable into a desired shape during the curing of the binder impregnated into the surface layer.

40 Claims, 6 Drawing Sheets

(51) Int. Cl.
    *B29B 11/12*     (2006.01)
    *B29K 63/00*     (2006.01)
    *B32B 37/14*     (2006.01)
    *B60R 13/08*     (2006.01)
    *F02B 77/13*     (2006.01)
    *B29K 105/08*     (2006.01)
    *G10K 11/168*     (2006.01)
    *B29K 277/00*     (2006.01)

(52) U.S. Cl.
    CPC .............. *B32B 37/14* (2013.01); *B60R 13/08* (2013.01); *F02B 77/13* (2013.01); *B29K 2063/00* (2013.01); *B29K 2105/0854* (2013.01); *B29K 2277/10* (2013.01); *B29K 2995/0002* (2013.01); *B29K 2995/0016* (2013.01); *B32B 2307/102* (2013.01); *B32B 2307/306* (2013.01); *B32B 2605/00* (2013.01)

(58) Field of Classification Search
    CPC ... B29B 2995/0016; B32B 5/022; B32B 7/12; B32B 37/14; B32B 2307/102; B32B 2307/306; B60B 13/08; F02B 77/13; B29K 2063/00; B29K 2277/10
    USPC ......................................................... 181/290
    See application file for complete search history.

(56) References Cited

U.S. PATENT DOCUMENTS

| | | | | |
|---|---|---|---|---|
| 8,387,748 | B2* | 3/2013 | Richardson | B32B 5/18 181/294 |
| 8,770,169 | B2* | 7/2014 | Koyama | F02F 7/0073 123/195 C |
| 9,190,045 | B2* | 11/2015 | Kim | D04H 1/4242 |
| 9,412,355 | B2* | 8/2016 | Kim | D04H 1/4242 |
| 9,881,599 | B2* | 1/2018 | Kim | B60R 13/08 |
| 2001/0036788 | A1 | 11/2001 | Sandoe et al. | |
| 2006/0225952 | A1 | 10/2006 | Takayasu et al. | |
| 2008/0236936 | A1 | 10/2008 | Niwa et al. | |
| 2009/0117388 | A1* | 5/2009 | Nakanishi | B32B 15/08 428/413 |
| 2010/0310822 | A1 | 12/2010 | Jokisch et al. | |
| 2010/0310882 | A1 | 12/2010 | Ogawa et al. | |
| 2011/0139542 | A1* | 6/2011 | Borroni | B32B 3/266 181/290 |
| 2011/0253474 | A1* | 10/2011 | Castagnetti | B60R 13/0815 181/290 |

FOREIGN PATENT DOCUMENTS

| | | |
|---|---|---|
| EP | 1733827 A1 | 12/2006 |
| JP | S58190541 A | 11/1983 |
| JP | 2001-002804 A | 1/2001 |
| JP | 2003-313272 A | 11/2003 |
| JP | 2005-335279 A | 12/2005 |
| JP | 2006078709 A | 3/2006 |
| JP | 2006-138935 A | 6/2006 |
| JP | 2007-039826 A | 2/2007 |
| JP | 2007-138953 A | 6/2007 |
| JP | 2008-012783 A | 1/2008 |
| JP | 2008-248866 A | 10/2008 |
| JP | 2009-078446 A | 4/2009 |
| JP | 2010-031579 A | 2/2010 |
| JP | 2012-144818 A | 8/2012 |
| KR | 10-2006-0003276 | 1/2006 |
| KR | 2006-0111330 | 10/2006 |
| KR | 10-2007-0033310 | 3/2007 |
| KR | 10-2007-0071351 | 7/2007 |
| WO | 2005/019783 A1 | 3/2005 |
| WO | 2009054349 A1 | 4/2009 |

OTHER PUBLICATIONS

International Preliminary Report on Patentability for International Application No. PCT/KR2014/002477, dated Jun. 21, 2016, and Written Opinion dated May 15, 2014, 11 pages.

* cited by examiner

Applied part (b)

SOUND ABSORBING AND INSULATING MATERIAL WITH IMPROVED HEAT RESISTANCE AND MOLDABILITY AND METHOD FOR MANUFACTURING THE SAME

CROSS-REFERENCE TO RELATED APPLICATIONS

This application claims the benefit of International Application No. PCT/KR2014/002477, filed Mar. 25, 2014, which also claims under 35 U.S.C. § 119, the priority of Korean Patent Application No. 10-2013-0159411, filed on Dec. 19, 2013, in the Korean Intellectual Property Office, the disclosure of which is incorporated herein by reference in its entirety.

BACKGROUND (a) Technical Field

The present invention relates to a sound absorbing and insulating material with improved heat resistance and moldability and a method for manufacturing the same. The sound absorbing and insulating material may include a heat-resistant layer, as a surface layer, that may be prepared by impregnating a binder into a nonwoven fabric formed of a heat-resistant fiber and a base layer that may be a conventional sound absorbing and insulating material. The heat-resistant layer may be stacked on one side of the base layer such that sound-absorbing property, flame retardancy, heat-insulating property and heat resistance thereof may be substantially improved as compared to the conventional sound absorbing and insulating material. The sound absorbing and insulating material may be applied to parts where high temperatures of about 200° C. or greater is maintained due to the surface layer. In addition, the absorbing and insulating material may be moldable into a desired shape during the curing of the binder impregnated into the surface layer.

(b) Background Art

Noise, as an unwanted side effect of industrial development, causes gradually more damages. Accordingly, various methods have been provided to prevent noise. As a way of such noise prevention, researches for developing new sound absorbing and insulating materials capable of arresting, absorbing or insulating sound have been conducted in various ways.

Representative industrial sectors requiring sound absorbing and insulating materials include electric appliances such as an air conditioner, a refrigerator, a washing machine, a lawn mower and the like, transportation such as a vehicle, a ship, an airplane and the like, construction materials such as a wall material, a flooring material and the like, and so forth. The sound absorbing and insulating material may also be required in other various industrial fields, too. In general, the sound absorbing and insulating materials used in industries require, in addition to good sound-absorbing property, reduced weight, flame retardancy, heat resistance and heat-insulating property, depending on their applications. Particularly, flame retardancy and heat resistance may be additionally required for sound absorbing and insulating materials, particularly when they are used in engines, exhaust systems and the like where high temperature of about 200° C. or greater is maintained. For example, an aramid fiber has been used for sound absorbing and insulating materials having superior heat resistance.

In addition, in order to provide functionalities such as flame retardancy, water repellency and the like to a sound absorbing and insulating material, many sound absorbing materials made of a nonwoven fabric containing aramid fibers and a functional skin material may be stacked.

For example, Korean Patent Publication No. 2007-0033310 discloses a flame-retardant sound absorbing material wherein a nonwoven fabric layer in which a heat-resistant short aramid fiber and a short thermoplastic polyester fiber are bridged and a skin material layer formed of a wetlaid nonwoven fabric consisting of a short aramid fiber are stacked.

In addition, Japanese Patent Publication No. 2007-0039826 discloses a water-repellent sound absorbing material wherein a nonwoven fabric layer of a heat-resistant short aramid fiber or a blend of a short aramid fiber and a short thermoplastic polyester fiber and a skin material layer treated with a water repellent are stacked.

Further, Japanese Patent Publication No. 2007-0138953 discloses a heat-resistant sound absorbing material wherein a nonwoven fabric layer consisting of a heat-resistant aramid fiber and a skin material layer formed of a fiber sheet containing a heat-resistant aramid fiber are stacked.

The description provided above as a related art of the present invention is just merely for helping understanding of the background of the present invention and should not be construed as being included in the related art known by those skilled in the art.

SUMMARY

In preferred aspects, the present invention provides a new sound absorbing and insulating material having superior sound-absorbing property, flame retardancy, heat-insulating property and heat resistance. Accordingly, the sound absorbing and insulating material formed in a stacked structure of a surface layer formed of a heat-resistant material on the surface of a base layer (conventional sound absorbing and insulating material). Since a binder of the surface layer penetrates into a nonwoven fabric having irregular micro cavities with a complicated three-dimensional labyrinth structure without blocking the micro cavities, the three-dimensional structure in the surface layer may be maintained during curing of the heat-resistant material.

The term "micro cavity(cavities)", as used herein, refers to a space or vacancy formed inside a nonwoven fabric layer and formed by fibers and may be regularly or irregularly arranged in the surface layer layer. Further, the micro cavities may be formed by any kinds of material in the surface layer, whether inherently existed or subsequently added. The micro cavities also may be formed by a binder, a resin additive, or the like, without limitation. The micro cavities may be open to outside of the nonwoven fabric or be connected therebetween in the surface layer layer. The micro cavities may include various shapes of internal cavities such as a pore, an open-ended or closed hole, a labyrinth, a channel, or the like. Size dimension (diameter or width) of the micro cavities may vary from several nanometer scale to hundreds micrometer scale, without limitation. In particular, the micro cavities may provide a resonance path of sound or noise, and further provide a sound absorbing property. The resonance path of a sound in the micro cavities may not be limited to a specific frequency of sound.

The present invention provides a sound absorbing and insulating material having superior sound-absorbing property, flame retardancy, heat-insulating property and heat resistance and moldability into a desired shape during the curing of the binder included in the surface layer.

The present invention also provides a method for manufacturing a sound absorbing and insulating material with improved heat resistance and moldability. The method may comprise preparing a heat-resistant material by impregnating a binder into a nonwoven fabric comprising of a heat-resistant fiber, drying the same so as to control the binder content on one side of a base layer, and stacking the prepared heat-resistant material on a base layer.

Further, the present invention provides a method for reducing noise by using the sound absorbing and insulating material in a noise-generating device.

In one aspect, the sound absorbing and insulating material may comprise: a base layer; and a surface layer comprising a nonwoven fabric comprising an amount of about 30 to 100 wt % of a heat-resistant fiber based on the total weight of the non-woven fiber and a binder present in the same layer as the nonwoven fabric. The binder may maintain a three-dimensional structure in the surface layer. In particular, the surface layer may be stacked on one side of the base layer.

The term "binder", as used herein, refers to a resin or a polymeric material that can be polymerized or cured to form a polymeric matrix. The binder may be cured (polymerized) or partially cured upon curing process such as heating, UV radiation, electron beaming, chemical polymerization using additives and the like. Preferably, the binder of the present invention may contain polyamic acid that can be polymerized into polyimide upon heating. Preferably, the binder according to the present invention generally refers to a thermosetting resin, for example, an epoxy resin binder.

The base layer and the surface layer may be stacked by an adhesive, heat or pressure. The adhesive may be the same binder included in the surface layer.

Preferably, the adhesive may be a thermosetting resin.

The base layer or the surface layer may be formed in a single layer or multiple layers. The base layer suitably may have a thickness of about 5 to 50 mm and the surface layer has a thickness of about 0.1 to 5 mm The base layer suitably may be at least one material selected from a group consisting of a polyethylene terephthalate fiber, a polypropylene fiber, a polyethylene fiber, a polyamide fiber, a glass wool, a polyurethane fiber and a melamine fiber.

The nonwoven fabric of the surface layer suitably may have a density of about 100 to 2000 g/m².

The heat-resistant fiber of the nonwoven fabric suitably may have a limiting oxygen index (LOI) of about 25% or greater and a heat resistance temperature of about 150° C. or greater.

The term "limiting oxygen index (LOI)" as used herein refers to a minimum concentration of oxygen, expressed as a percentage, that will support combustion of a polymer. The LOI can be measured by passing a mixture of oxygen and nitrogen over a burning specimen, and reducing the oxygen level until a critical level is reached. The LOI values for different plastics or polymers, for example, an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber, can be determined by standardized tests, such as the ISO 4589 and ASTM D2863.

The heat-resistant fiber suitably may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber.

Preferably, the heat-resistant fiber may be an aramid fiber having a fineness of about 1 to 15 denier.

The binder included in the surface layer suitably may be a thermosetting resin.

Preferably, the thermosetting resin for the binder or for the adhesive may be an epoxy resin.

The epoxy resin suitably may be one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

The sound absorbing and insulating material may be molded to have a three-dimensional shape corresponding to that to which the sound absorbing and insulating material is applied.

The sound absorbing and insulating material may be used for a vehicle.

In another aspect, the present invention provides a method for manufacturing a sound absorbing and insulating material. The method may comprise steps of: a) immersing a nonwoven fabric comprising an amount of about 30 to 100 wt % of a heat-resistant fiber based on the total weight of the nonwoven fabric in a binder solution; b) forming a surface layer by drying the nonwoven fabric; and c) stacking the surface layer on one side of a base layer.

The method may further comprise a step of, after the step c), d) molding the sound absorbing and insulating material.

Preferably, in the step b), the nonwoven fabric may be dried at a temperature of 70 about 200° C. and the surface layer formed after drying may comprise an amount of about 1 to 300 parts by weight of a binder based on 100 parts by weight of the nonwoven fabric.

In addition, in the step c), the surface layer and the base layer may be stacked by an adhesive, heat or pressure.

Preferably, the adhesive may be the same binder included in the surface layer.

The adhesive suitably may be a thermosetting resin.

The base layer or the surface layer may be formed in a single layer or multiple layers.

The base layer suitably may be at least one material selected from a group consisting of a polyethylene terephthalate fiber, a polypropylene fiber, a polyethylene fiber, a polyamide fiber, a glass wool, a polyurethane fiber and a melamine fiber.

The heat-resistant fiber of the nonwoven fabric may have a limiting oxygen index (LOI) of about 25% or greater and a heat resistance temperature of about 150° C. or greater.

The heat-resistant fiber suitably may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber.

The heat-resistant fiber may be an aramid fiber having a fineness of about 1 to 15 denier and a yarn length of about 20 to 100 mm The nonwoven fabric suitably may have a thickness of about 3 to 20 mm and a density of about 100 to 2000 g/m².

The nonwoven fabric may be formed by continuously performing up-down needling, down-up needling and up-down needling. The nonwoven fabric suitably may be formed with a needle stroke of about 30 to 350 times/m².

In the step a), the binder solution may comprise an amount of about 1 to 60 wt % of a binder, an amount of about 0.1 to 10 wt % of a curing agent, an amount of about 0.01 to 5 wt % of a catalyst, an amount of about 1 to 40 wt % of an additive and a solvent constituting the remaining balance of the binder solution, all the wt % are based on the total weight of the binder solution.

Alternatively, in the step a). the binder solution may comprise an amount of about 1 to 30 wt % of the binder, an amount of about 0.1 to 10 wt % of a curing agent, an amount of about 0.01 to 5 wt % of a catalyst, an amount of about 1 to 30 wt % of a flame retardant and an amount of about 40 to 95 wt % of a solvent, all the wt % are based on the total weight of the binder solution.

The binder may be a thermosetting resin.

Preferably, the thermosetting resin for the adhesive or the binder may be an epoxy resin. The epoxy resin suitably may be one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

The sound absorbing and insulating material may be used for a vehicle.

In another aspect, the present invention provides a method for reducing noise of a noise-generating device. The method may comprise steps of: i) checking a three-dimensional shape of a noise-generating device; ii) preparing and molding the above-described sound absorbing and insulating material so as to correspond to the three-dimensional shape of the device partially or entirely; and iii) bringing the sound absorbing and insulating material adjacent to the noise-generating device.

The term "partially" as used herein covers a portion of surface from the total surface of a device. For example, the partially corresponding molded material may cover 10% or less, 20% or less, 30% or less, 40% or less, 50% or less, 60% or less, 70% or less, 80% or less, 90% or less, or 95% or less from the total structure or surface of a device.

Preferably, the device may be a motor, an engine or an exhaust system, particularly for a vehicle.

The sound absorbing and insulating material may be brought adjacent to the noise-generating device by attaching the sound absorbing and insulating material to the noise-generating device, providing the sound absorbing and insulating material with a distance from the noise-generating device, or molding the sound absorbing and insulating material as a part of the noise-generating device.

Further provided is a vehicle that may comprise the sound absorbing and insulating material as described herein.

Other aspects of the invention are disclosed infra.

The sound absorbing and insulating material of the present invention may include heat-resistant material, as the surface layer, in which the binder is impregnated into the nonwoven fabric formed of the heat-resistant fiber and the base layer stacked together with the heat-resistant material on one side thereof. Accordingly, the sound-absorbing property, flame retardancy, heat-insulating property and heat resistance of the base layer may be substantially improved and the sound absorbing and insulating material may be shaped into a three-dimensional shape due to the binder.

In addition, the sound absorbing and insulating material of the present invention may be produced with a functional additive as being included in the binder solution.

Since flame retardancy, heat-insulating property and heat resistance are superior in addition to sound-absorbing property, the sound absorbing and insulating material may not be deformed or denatured even when used in a noise-generating device maintained at high temperatures of 200° C. or greater.

Further, when a thermosetting resin is used as the binder, a desired shape may be molded during the curing of the thermosetting resin. That is to say, the overall process may be simplified since the curing and molding of the thermosetting resin are achieved simultaneously.

In addition, since a nonwoven fabric formed of a heat-resistant fiber is used, thermal deformation of the nonwoven fabric due to the reaction heat of thermal curing may not occur even when a thermosetting resin is used as the binder.

Moreover, since the heat-resistant fiber is used intensively at high amounts only in the surface layer, the desired heat-resistant effect may be ensured with minimized use of the expensive heat-resistant fiber.

Accordingly, the sound absorbing and insulating material of the present invention may be useful in applications requiring arresting, absorbing or insulating of sound, including electric appliances such as an air conditioner, a refrigerator, a washing machine, a lawn mower and the like, transportation such as a vehicle, a ship, an airplane and the like, construction materials such as a wall material, a flooring material and the like, and so forth. The sound absorbing and insulating material of the present invention may also be used in a noise-generating device maintained at high temperatures of 200° C. or greater. In particular, when the sound absorbing and insulating material of the present invention is used in a vehicle, it may be closely attached to a noise-generating device of the vehicle such as an engine, an exhaust system and the like, provided with a distance from the noise-generating device, or molded as a part of the noise-generating device.

BRIEF DESCRIPTION OF DRAWINGS

The above and other objects, features and advantages of the present invention will be more clearly understood from the following detailed description taken in conjunction with the accompanying drawing, in which:

FIG. 2A is an image of an exemplary nonwoven fabric before impregnation of a binder, FIG. 2B is an image of an exemplary nonwoven fabric in which 20 parts by weight of a binder has been impregnated based on 100 parts by weight of the nonwoven fabric, and FIG. 2C is an image of an exemplary nonwoven fabric in which 50 parts by weight of a binder has been impregnated based on 100 parts by weight of the nonwoven fabric.

FIG. 3A shows an exemplary sound absorbing and insulating material molded for use in a vehicle engine, and FIG. 3B shows an example wherein an exemplary sound absorbing and insulating material can be applied in a part of a vehicle engine.

FIG. 4A shows an exemplary sound absorbing and insulating material molded for use in a lower part of a vehicle, and FIG. 4B shows an exemplary sound absorbing and insulating material attached to a lower part of a vehicle.

DETAILED DESCRIPTION OF MAIN ELEMENTS

Figure 1:
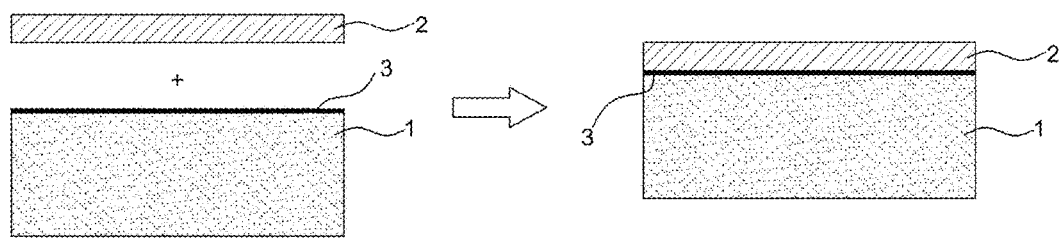
FIG. 1 schematically shows a cross-sectional structure of an exemplary sound absorbing and insulating material of the present invention, and a surface layer 2 of a nonwoven fabric in which a binder is uniformly impregnated is stacked on one side of a base layer 1 formed of a conventional sound absorbing and insulating material by an adhesive 3.

1: base layer formed of conventional sound absorbing and insulating material
2: surface layer formed of binder-impregnated nonwoven fabric
3: adhesive layer Detailed Description Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention relates to a sound absorbing and insulating material which may have improved heat resistance and moldability and a method for manufacturing the same. The sound absorbing and insulating material may be obtained by stacking a surface layer formed of a specific heat-resistant material on a base layer formed of a conventional sound absorbing and insulating material. Accordingly, the sound absorbing and insulating material may have substantially improved sound-absorbing property, flame retardancy, heat-insulating property and heat resistance and may be moldable into a desired three-dimensional shape using a binder impregnated in the surface layer.

In one aspect, the present invention provides a sound absorbing and insulating material that may comprise: a base layer; and a surface layer comprising a nonwoven fabric comprising an amount of about 30 to 100 wt % of a heat-resistant fiber based on the total weight of the nonwoven fabric and a binder present in the same layer as the nonwoven fabric and maintaining a three-dimensional structure in the surface layer. The surface layer may be stacked on one side of the base layer. The base layer may be suitably selected from conventional materials that can be used for sound absorbing and insulating purposes in the related art without limitation.

In an exemplary embodiment of the present invention, the base layer and the surface layer may stacked by an adhesive, heat or pressure.

In an exemplary embodiment of the present invention, the adhesive used for stacking between the base layer and the surface layer may be the same binder is included in the surface layer. Preferably, the adhesive may be a thermosetting resin.

In an exemplary embodiment of the present invention, each of the base layer and the surface layer may be formed in a single layer or multiple layers. The base layer may have a thickness of about 5 to 50 mm and the surface layer may have a thickness of about 0.1 to 5 mm In an exemplary embodiment of the present invention, the base layer may be formed of a conventional sound absorbing and insulating material formed of at least one material selected from a group consisting of a polyethylene terephthalate fiber, a polypropylene fiber, a polyethylene fiber, a polyamide fiber, a glass wool, a polyurethane fiber and a melamine fiber.

In an exemplary embodiment of the present invention, the heat-resistant fiber constituting the nonwoven fabric may have a limiting oxygen index (LOI) of about 25% or greater and a heat resistance temperature of about 150° C. or greater.

In an exemplary embodiment of the present invention, the heat-resistant fiber may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

In another exemplary embodiment of the present invention, the heat-resistant fiber may be an aramid fiber.

In an exemplary embodiment of the present invention, the nonwoven fabric may be formed of an aramid fiber having a fineness of about 1 to 15 denier and may be a single-layered nonwoven fabric having a thickness of about 3 to 20 mm In an exemplary embodiment of the present invention, the nonwoven fabric may have a density of about 100 to 2000 g/m², or particularly of about 200 to 1200 g/m².

In an exemplary embodiment of the present invention, the binder may be a thermosetting resin.

In another exemplary embodiment of the present invention, the thermosetting resin may be an epoxy resin capable of forming a three-dimensional network structure in the internal structure of the nonwoven fabric.

In another exemplary embodiment of the present invention, the epoxy resin may be one or more epoxy resin selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

The structure of the sound absorbing and insulating material according to the present invention is described in more detail referring to FIG. 1 and FIGS. 2A-2C.

FIG. 1 schematically shows the cross-sectional structure of the sound absorbing and insulating material of the present invention. As shown in FIG. 1, the sound absorbing and insulating material according to the present invention may have a surface layer 2 of a nonwoven fabric in which a binder may be uniformly impregnated stacked on one side of a base layer 1 that may be formed of a conventional sound absorbing and insulating material.

Particularly, the present invention provides the sound absorbing and insulating material comprising the surface layer. The surface layer may comprise a nonwoven fabric comprising an amount of about 30 to 100 wt % of a heat-resistant fiber based on the total weight of the nonwoven fabric and a binder present in the same layer as the nonwoven fabric and maintaining a three-dimensional structure in the surface layer. The surface layer suitably may have a thickness less than the thickness of the base layer and may comprise the heat-resistant fiber with an substantially reduced content based on the total weight of the fiber materials used to prepare the sound absorbing and insulating material. The surface layer formed of a heat-resistant material significantly may be stacked on the base layer thereby improve sound-absorbing property, flame retardancy, heat-insulating property and heat resistance. In addition, the surface layer may be molded into a desired three-dimensional shape by using the binder.

Figure 2A:
FIGS. 2A-2C show electron microscopic images (x300) of an exemplary nonwoven fabric constituting a surface layer.
Figure 2B:
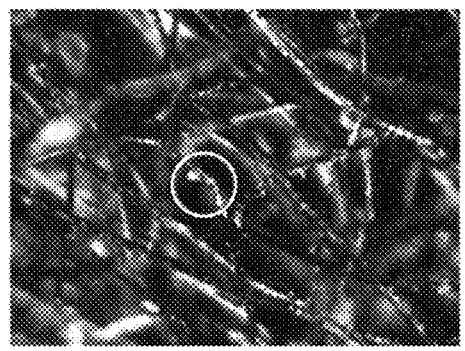
Figure 2C:
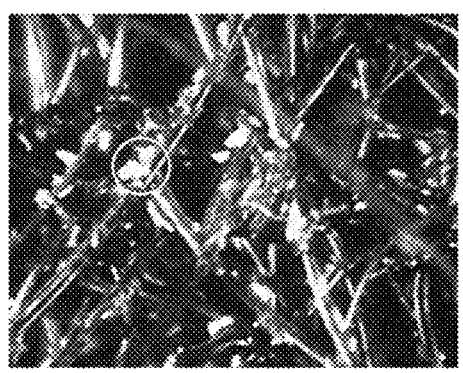

The internal structure of the surface layer 2 is described in more detail referring to FIGS. 2A-2C.

FIGS. 2A-2C show electron microscopic images showing the three-dimensional structure in the surface layer before and after impregnation of the binder.

FIG. 2A is an electron microscopic image showing the internal structure of the nonwoven fabric before impregnation of the binder. It can be seen that heat-resistant fiber yarns cross each other to form irregular micro cavities. FIGS. 2B and 2C are electron microscopic images after impregnation of the binder into the nonwoven fabric. It can be seen that the binder is finely and uniformly distributed and attached to the heat-resistant fiber yarns. In addition, the content of the binder on the yarn surface may increase as the content of the binder increases as comparing in FIGS. 2B and 2C.

Although there may be differences depending on the preparation method, fibers constituting the nonwoven fabric may be randomly arranged three-dimensionally in a nonwoven fabric. Accordingly, the pore structure inside a nonwoven fabric tends to be a very complicated labyrinth structure (labyrinth system) wherein regularly or irregularly arranged fibers are three-dimensionally interconnected rather than bundles of independent capillary tubes. That is to say, the nonwoven fabric used in the surface layer has irregular micro cavities formed as the yarns formed of the heat-resistant fiber loosely cross each other.

When the binder is impregnated into the nonwoven fabric, the binder may be finely and uniformly distributed and attached to the surface of yarn fibers of the nonwoven fabric formed of the heat-resistant fiber, thereby forming much finer micro cavities than before the impregnation. The formation of fine micro cavities in the internal structure of the nonwoven fabric means increased resonance of noise and thus improved sound-absorbing property. If the binder forms a three-dimensional network structure as it is cured, the sound-absorbing property can be further improved since more numbers of the fine micro cavities can be formed in the surface layer.

Accordingly, the nonwoven fabric may maintain the intrinsic three-dimensional structure as the binder is uniformly impregnated into the nonwoven fabric. Additionally, since more numbers of the fine micro cavities can be formed as the binder is cured, the surface layer may have remarkably improved sound-absorbing performance due to the maximized noise absorption through increased resonance in the nonwoven fabric.

As seen from the electron microscopic images of FIGS. 2A-2C, the surface layer may have an internal structure in which the binder is uniformly dispersed and distributed on the surface of the heat-resistant fiber yarns constituting the nonwoven fabric.

Hereinafter, the components of the surface layer having such an internal structure are described in more detail.

A heat-resistant fiber may be used as the main fiber constituting the nonwoven fabric. The heat-resistant fiber may be any one having superior durability and capable of enduring high-temperature and ultrahigh-temperature conditions. Preferably, the heat-resistant fiber may be one having a limiting oxygen index (LOI) of about 25% or greater and a heat resistance temperature of about 150° C. or greater. In particular, the heat-resistant fiber may be one having a limiting oxygen index (LOI) of about 25 to 80% and a heat resistance temperature of about 150 to 30000° C. Further, in particular, the heat-resistant fiber may be one having a limiting oxygen index (LOI) of about 25 to 70% and a heat resistance temperature of about 200 to 1000° C.

The heat-resistant fiber suitably may have a fineness of about 1 to 15 denier, of particularly of about 1 to 6 denier and a yarn length of about 20 to 100 mm, or particularly 40 to 80 mm The heat-resistant fiber may be a 'super fiber' as commonly known in the related art. The heat-resistant super fiber suitably may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber, a ceramic fiber and the like.

Preferably, an aramid fiber may be used as the heat-resistant fiber in the present invention. For example, meta-aramid, para-aramid or a mixture thereof may be used as the heat-resistant fiber in the present invention. The aramid fiber used as the yarn of the nonwoven fabric in the present invention may have a fineness of about 1 to 15 denier, or particularly of about 1 to 6 denier, and a yarn length of about 20 to 100 mm, or particularly of about 40 to 80 mm. When the yarn length is less than the predetermined range, for example, less than about 20 mm, bridging of yarns may be difficult during needle punching and thus, cohesion of the nonwoven fabric may be weak. When the yarn length is greater than the predetermined range, for example, greater than about 100 mm, cohesion of the nonwoven fabric may be superior but movement of yarns may be difficult during carding.

The aramid fiber may be an aromatic polyamide fiber wherein aromatic rings such as benzene ring are bonded with each other by amide groups. To distinguish from an aliphatic polyamide (e.g., nylon), the aromatic polyamide fiber is called 'aramid'. The aramid fiber is prepared by spinning of aromatic polyamide and is classified into meta-aramid and para-aramid depending on the location of the amide bonds.

[Chemical Formula 1]

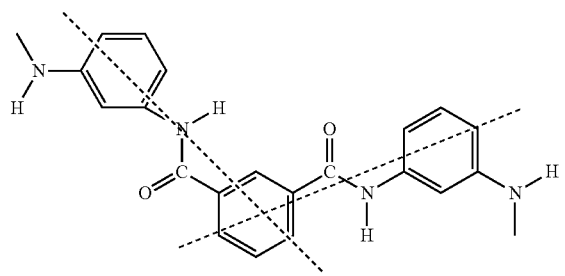

[Chemical Formula 2]

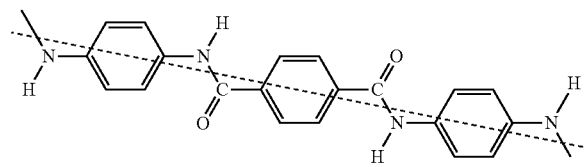

The meta-aramid (m-aramid) represented by Chemical Formula 1 may be prepared by dry spinning after dissolving isophthaloyl chloride and m-phenylenediamine in a dimethylacetamide (DMAc) solvent. The meta-aramid may have a relatively high elongation at break of about 22 to 40% due to the uneven polymer structure, may be dyed and may be easily prepared into fiber. It is appreciated that Nomex™ (DuPont, USA) and Conex™ (Teijin, JAPAN) may be suitably provided as the meta-aramid without limitation, but the examples are not limited thereto.

The para-aramid (p-aramid) represented by Chemical Formula 2 may be prepared by wet spinning after dissolving terephthaloyl chloride and p-phenylenediamine in an N-methylpyrrolidone (NMP) solvent. The para-aramid may have high strength due to its highly oriented linear molecular structure. The para-aramid may be stronger than meta-aramid about 3 to 7 times, and may be used as reinforcement or protection materials. Further, the para-aramid may have strong chemical resistance, less thermal shrinkage and superior dimensional stability as well as high tensile strength, flame resistance and self-extinguishing property. It is appreciated that Kevlar™ (DuPont, USA), Twaron™ (Teijin, JAPAN) and Technora™ (Teijin, JAPAN) may be suitably provided as the para-aramid, but the examples are not limited thereto.

The aramid may be provided in the form of filament, staple, yarn and the like and is used for reinforcing materials (transformer, motor and the like), insulating materials (insulating paper, insulating tape and the like), heat-resistant fibers (fireproof clothing, gloves and the like), high-temperature filters, or the like.

Although the nonwoven fabric constituting the surface layer in the present invention is practically prepared from the heat-resistant fiber yarn, nonwoven fabrics prepared by further adding other fibers to the heat-resistant fiber yarn, to reduce cost or provide reduced weight, functionality and the like to the nonwoven fabric, may also be included in the scope of the present invention. That is to say, although the nonwoven fabric of the present invention is prepared from the heat-resistant fiber yarn, the present invention is not limited to the nonwoven fabric formed only of the heat-resistant fiber. The nonwoven fabric of the present invention may include the heat-resistant fiber yarn in an amount of about 30 to 100 wt %, or particularly of about 60 to 100 wt %, based on the total weight of the nonwoven fabric.

Further, the surface layer may include the binder impregnated therein, which may be present in the same layer as the nonwoven fabric and maintain the three-dimensional structure inside the nonwoven fabric in the surface layer. The binder used in the present invention may be any one capable of maintaining the three-dimensional structure in the surface layer. The expression 'maintaining the three-dimensional structure in the surface layer' means that the binder, which has been impregnated into the nonwoven fabric, may be uniformly distributed and attached to the surface of the fiber yarn of the nonwoven fabric and maintain or further form irregular micro cavities, thereby maintaining the original three-dimensional structure in the surface layer.

Although a binder generally refers to a material used to adhere or join two materials, the term binder used in the present invention refers to a material impregnated into the nonwoven fabric formed of the heat-resistant fiber without limitation.

Many materials may be used as the binder impregnated into the nonwoven fabric. First, a thermoplastic resin or a thermosetting resin may be considered as the binder material.

The thermoplastic resin which is represented by a polyamide-based resin has crystalline polar groups like the aramid fiber as a representative heat-resistant fiber. As such, when a thermoplastic binder is impregnated into the nonwoven fabric formed of the thermoplastic heat-resistant fiber, a strong interfacial layer may be formed between them by face-to-face contact between the similar crystalline polar groups, which partially may block the micro cavities of the nonwoven fabric. That is to say, when a thermoplastic resin is used as the binder impregnated into the nonwoven fabric formed of the thermoplastic heat-resistant fiber, sound-absorbing performance may be decreased due to the partial blocking of the micro cavities of the nonwoven fabric. At a glimpse, it may be thought that the sound-absorbing performance would be improved if the micro cavities are blocked. However, since noise is not extinguished in the surface layer but is transmitted via other routes, improvement of sound-absorbing performance may not be expected when the thermoplastic binder is impregnated. Further, when the thermoplastic binder is impregnated into a nonwoven fabric formed of the inorganic-based heat-resistant fiber, an adhesive additive may have to be further added because of weak binding.

In contrast, a thermosetting binder may have totally different physical and chemical properties from the thermoplastic heat-resistant fiber. When a thermosetting binder is impregnated into the nonwoven fabric formed of the thermoplastic heat-resistant fiber, an interfacial layer may be formed by edge-to-edge contact because of the difference in characteristics. As a result, the micro cavities of the nonwoven fabric may remain open. Accordingly, when a thermosetting resin is used as the binder impregnated into the nonwoven fabric formed of the heat-resistant fiber, the three-dimensional structure in the surface layer may be maintained. Without wishing to be bound to the theory, a thermosetting resin may be used preferably as the binder in the present invention.

Furthermore, the thermosetting resin may have the characteristics that it is curable with light, heat or a curing agent and its shape may not be deformed even at high temperatures. Accordingly, by using the heat-resistant fiber and the thermosetting binder with a specific condition the shape of the sound absorbing and insulating material may be maintained even at high temperatures. Therefore, when a thermosetting resin is used as the binder impregnated into the nonwoven fabric, a desired shape may be molded during the curing of the resin and the resulting shape may be maintained even at high temperatures.

As described above, when a thermosetting resin is used as the binder impregnated into the nonwoven fabric formed of the heat-resistant fiber, the effects of maintaining the three-dimensional structure in the surface layer and at a same time, molding into a desired shape during the curing of the binder resin may be expected.

Preferably, an epoxy resin may be used as the binder. The epoxy resin is a kind of a thermosetting resin and is curable into a polymer material having a three-dimensional network structure. Accordingly, the epoxy resin may form a network structure and thus micro cavities when cured in the surface layer, more numbers of the fine micro cavities may be formed in the surface layer and the sound-absorbing performance may be substantially improved.

Further, because more advanced three-dimensional network structure is formed if the curing is carried out in the presence of a curing agent, the sound-absorbing effect may be further improved. That is to say, a three-dimensional network-structured polymer may be formed as the epoxy groups or hydroxy groups of the epoxy resin react with the functional groups of the curing agent such as amine groups or carboxylic acid groups to form covalent crosslinkages. The curing agent may not only serve as a catalyst that catalyzes curing reaction but also be directly involved in the reaction and may be linked in the molecule of the epoxy resin. Accordingly, the size and physical properties of the micro cavities may be suitably controlled by selecting different curing agents.

The epoxy resin suitably may be one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin, o-cresol novolac epoxy resin and the like. The epoxy resin may be one having an epoxy equivalent of about 70 to 400. When the epoxy equivalent is less than the predetermined range, for example, less than about 70, intermolecular binding may be too weak to form a three-dimensional network structure or the physical properties of the sound absorbing and insulating material may be unsatisfactory because of weak adhesion with the heat-resistant fiber. When the epoxy equivalent is greater than the predetermined range, for example, greater than about 400, the physical properties of the sound absorbing and insulating material may be unsatisfactory because a very dense network structure may be formed.

When a thermosetting resin is used as the binder in the present invention, the curing agent may be included in a binder solution. The curing agent may be one having functional groups that can react readily with the functional groups of the binder such as epoxy groups or hydroxy groups. As the curing agent, an aliphatic amine, an aromatic amine, an acid anhydride, urea, an amide, imidazole and the like may be used. Preferably, the curing agent may be one or more selected from a group consisting of diethyltoluenediamine (DETDA), diaminodiphenylsulfone (DDS), boron trifluoride-monoethylamine ($BF_3$. MEA), diaminocyclohexane (DACH), methyltetrahydrophtalic anhydride (MTHPA), methyl-5-norbornene-2,3-dicarboxylic anhydride (NMA), dicyandiamide (Dicy), 2-ethyl-4-methylimidazole and the like. Particularly, an aliphatic amine- or amide-based curing agent may be used because they have relatively good crosslinking ability and very superior chemical resistance and weather resistance. For example, dicyandiamide (Dicy) may be used in consideration of crosslinking ability, flame retardancy, heat resistance, storage stability, processability and the like. Because dicyandiamide (Dicy) has a high melting point above 200° C., superior storage stability thereof may be maintained after being mixed with the epoxy resin and sufficient processing time for curing and molding may be ensured.

Further, a catalyst that facilitates the curing of the thermosetting resin used as the binder may be used in the present invention. The catalyst may be one or more selected from a group consisting of urea, dimethylurea, a tetraphenylborate salt of quaternary DBU, quaternary phosphonium bromide and the like. The catalyst may be included in the binder-containing solution.

In addition, various additives such as a flame retardant, a heat resistance improver, a water repellent and the like may be used to provide functionalities to the sound absorbing and insulating material. The additive may be included in the binder solution and additional skin materials for providing functionalities to the sound absorbing and insulating material may not be necessary.

The flame retardant may be melamine, a phosphate, a metal hydroxide and the like Preferably, one or more selected from a group consisting of melamine, melamine cyanurate, melamine polyphosphate, phosphazene, ammonium polyphosphate and the like may be used as the flame retardant. For example, the flame retardant may be melamine, which may enhance flame retardancy and heat resistance at the same time.

The heat resistance improver may be alumina, silica, talc, clay, glass powder, glass fiber, metal powder and the like One or more fluorine-based water repellent may be used as the water repellent.

In addition, additives commonly used in the art may be selected and used depending on purposes.

As described above, the sound absorbing and insulating material of the present invention may have a structure in which a surface layer formed of a specific heat-resistant material is stacked on one side of a base layer formed of a conventional sound absorbing and insulating material. The base layer and the surface layer may be stacked by bonding using an adhesive or using heat or pressure. For example, when the stacking is performed using an adhesive, an adhesive may be coated on one side of the base layer or the surface layer and then the two layers may be stacked. The adhesive may be any one commonly used in the art, without limitation. Because the binder impregnated into the surface layer in the present invention also has adhesive property, the same or different binder may also be used as the adhesive. In particular, when the binder is used as the adhesive, a thermosetting resin may be used because stronger adhesive effect is expected since the thermosetting resin is cured by the heat applied during molding. Preferably, an epoxy resin may be used as the adhesive. The amount of the adhesive used is not particularly limited in the present invention. The amount can be controlled within a range allowed for the adhesion of the two layers.

In the sound absorbing and insulating material of the present invention, each of the base layer and the surface layer may be formed in a single layer or multiple layers. When the base layer or the surface layer is formed of multiple layers, the individual layers may be made of the same or different materials. Because the present invention is directed to improving sound-absorbing property, flame retardancy, heat-insulating property, heat resistance and moldability by further stacking the surface layer to a conventional sound absorbing and insulating material, the material, layer structure and the like of the base layer are not particularly limited. That is to say, any conventional sound absorbing and insulating material may be used as the base layer of the present invention to achieve the effect desired by the present invention. Examples of the conventional sound absorbing and insulating material may include a polyethylene terephthalate fiber, a polypropylene fiber, a polyethylene fiber, a polyamide fiber, a glass wool, a polyurethane fiber, a melamine fiber and the like.

In another aspect, the present invention provides a method for manufacturing a sound absorbing and insulating material. The method may comprise steps of: a) immersing a nonwoven fabric comprising an amount of about 30 to 100 wt % of a heat-resistant fiber based on the total weight of the nonwoven fabric in a binder solution; b) forming a surface layer by drying the nonwoven fabric; and c) stacking the surface layer on one side of a base layer. As described above, the base layer may be any known conventional sound absorbing and insulating material.

Hereinafter, the steps of the method for manufacturing a sound absorbing and insulating material according to the present invention are described in detail.

In the step a), a nonwoven fabric formed of a heat-resistant fiber may be immersed in a binder solution.

In the present invention, the nonwoven fabric may be immersed in the binder solution so as to improve sound-absorbing and sound-insulating performance and the sound absorbing and insulating material may be molded into a desired shape. The binder solution in which the nonwoven fabric is immersed may comprise, in addition to a binder resin, a curing agent, a catalyst, commonly used additives and a solvent.

The binder, the curing agent, the catalyst and the commonly used additives contained in the binder solution may be the same ad described above. The solvent used to prepare the binder solution suitably may be one or more selected from a group consisting of a ketone, a carbonate, an acetate, a cellosolve and the like. Preferably, the solvent may be one or more selected from acetone, methyl ethyl ketone (MEK), methyl isobutyl ketone (MIBK), dimethyl carbonate (DMC), ethyl acetate, butyl acetate, methyl cellosolve, ethyl cellosolve, butyl cellosolve and the like. The binder solution used in the present invention suitably may comprise an amount of about 1 to 60 wt % of a binder based on the total weight of the binder solution and a solvent as the remainder. The binder solution used in the present invention may further comprise a curing agent and other additives including a catalyst. In this case, the binder solution may comprise an amount of about 1 to 60 wt % of a binder, an amount of about 0.1 to 10 wt % of a curing agent, an amount of about 0.01 to 5 wt % of a catalyst, an amount of about 1 to 40 wt % of additives and a solvent as the remainder, all the wt % based on the total weight of the binder solution. Alternatively, the binder solution may comprise an amount of about 1 to 30 wt % of a binder, an amount of about 0.1 to 10 wt % of a curing agent, an amount of about 0.01 to 5 wt % of a catalyst, an amount of about 1 to 30 wt % of a flame retardant as an additive and an amount of about 40 to 95 wt % of a solvent, all the wt % based on the total weight of the binder solution.

The degree of impregnation into the nonwoven fabric may be suitably controlled by controlling the concentration of the binder solution of the present invention. Preferably, the binder solution may be prepared to have a solid content of about 1 to 60 wt %, or particularly of about 20 to 50 wt %, based on the total weight of the binder solution. When the binder solution includes the solid content less than the predetermined amount, for example, less than about 1 wt % based on the total weight of the binder solution, the purpose of the present invention cannot be accomplished because the content of the binder impregnated into the nonwoven fabric may be small. When the binder solution includes the solid content greater than about the predetermined amount, for example, greater than about 60 wt % based on the total weight of the binder solution, the nonwoven fabric may become hard and may not serve as a sound absorbing and insulating material.

When the content of the curing agent contained in the binder solution is less than the predetermined amount, for example, less than about 0.1 wt % based on the total weight of the binder solution, molding into a desired shape may be difficult because complete curing of the binder may not be obtained. As a result, the effect of improving the mechanical strength of the sound absorbing and insulating material may be unsatisfactory. When the content of the curing agent is greater than the predetermined amount, for example, greater than about 10 wt % based on the total weight of the binder solution, the sound absorbing and insulating material may become hard and storage stability and the like may be unsatisfactory.

When the content of the catalyst is less than the predetermined amount, for example, less than about 0.01 wt % based on the total weight of the binder solution, the effect of facilitating reaction may not be sufficient. When the content of the catalyst is greater than the predetermined amount, for example, greater than about 5 wt % based on the total weight of the binder solution, storage stability and the like may be unsatisfactory. The additives may be one or more additive(s) commonly used in the art, including a flame retardant, a heat resistance improver, a water repellent and the like.

The content of these additives may be adjusted adequately depending on the purpose of addition. When the content of the additives is less than the predetermined amount, for example, less than about 1 wt % based on the total weight of the binder solution, the desired effect may not be achieved. When the content of the additives is greater than the predetermined amount, for example, greater than about 40 wt % based on the total weight of the binder solution, it may be economically unfavorable and those additives may cause undesired side effects.

In the step b), a surface layer may be prepared by drying the nonwoven fabric.

The drying in the present invention may be carried out by taking out the nonwoven fabric from the binder solution and removing the solvent. The drying may be carried out at suitably controlled temperatures under pressure. Particularly, the drying process may include a process of taking out the nonwoven fabric and controlling the binder content in the nonwoven fabric by compressing at a pressure of about 1 to 20 kgf/cm$^2$. In addition, the drying process may include a process of taking out the nonwoven fabric and evaporating the solvent by heating at a temperature of about 70 to 200° C. Alternatively, the drying process may include a process of compressing the nonwoven fabric at a pressure of about 1 to 20 kgf/cm$^2$ and then heating at a temperature of about 70 to 200° C. after taking out the nonwoven fabric.

During the drying process, the content of the binder in the nonwoven fabric may be controlled. For example, the physical properties of the sound absorbing and insulating material may be controlled. The content of the binder included in the nonwoven fabric after the drying may be an important factor determining the size, shape and distribution of micro cavities inside the sound absorbing and insulating material. Accordingly, the sound-absorbing property and mechanical property of the sound absorbing and insulating material may be controlled therewith. In the present invention, the drying may be carried out such that the final content of the binder included in the nonwoven fabric may be about 1 to 300 parts by weight, or particularly about 30 to 150 parts by weight, based on 100 parts by weight of the nonwoven fabric.

In the step c), the surface layer prepared in the step b) may be stacked on one side of a base layer formed of a conventional sound absorbing and insulating material.

The stacking may be performed by bonding using an adhesive or using heat or pressure. For example, when the stacking is performed using an adhesive, an adhesive may be coated on one side of the base layer or the surface layer and then the two layers may be stacked.

The method for manufacturing a sound absorbing and insulating material according to the present invention may further include, after the step c), d) a step of molding the sound absorbing and insulating material at high temperature.

In an exemplary embodiment, the method for manufacturing a sound absorbing and insulating material may include steps of: a) a step of immersing a nonwoven fabric comprising an amount of about 30 to 100 wt % of a heat-resistant fiber based on the total weight of the nonwoven fabric in a binder solution; b) forming a surface layer by drying the nonwoven fabric; c) stacking the surface layer on one side of a base layer formed of a conventional sound absorbing and insulating material; and d) molding the sound absorbing and insulating material at high temperature.

In the step d), the sound absorbing and insulating material formed by stacking the base layer and the surface layer may be molded at high temperature. The molding at high temperature may also include the curing of the thermosetting binder and may be carried out at a temperature of about 150 to 300° C., or particularly at a temperature of about 170 to 230° C.

The method for manufacturing a sound absorbing and insulating material according to the present invention may further include, before the step a), a step of forming a nonwoven fabric by a needle punching process using a heat-resistant fiber. For example, in the step a-1), an aramid nonwoven fabric having a thickness of about 3 to 20 mm may be formed by a needle punching process of a heat-resistant aramid fiber having a fineness of about 1 to 15 denier.

In an exemplary embodiment, the method for manufacturing a sound absorbing and insulating material according to the present invention including the step a-1) may include steps of: a-1) forming a nonwoven fabric having a thickness of about 3 to 20 mm by a needle punching process using a heat-resistant fiber having a fineness of about 1 to 15 denier; a) immersing the nonwoven fabric comprising an amount of about 30 to 100 wt % of a heat-resistant fiber based on the total weight of the nonwoven fabric in a binder solution; b) forming a surface layer by drying the nonwoven fabric; and c) stacking the surface layer on one side of a base layer formed of a conventional sound absorbing and insulating material.

Further, the method for manufacturing a sound absorbing and insulating material according to the present invention including the step a-1) may include steps of: a-1) forming a nonwoven fabric having a thickness of about 3 to 20 mm by a needle punching process using a heat-resistant fiber having a fineness of about 1 to 15 denier; a) immersing the nonwoven fabric comprising an amount of about 30 to 100 wt % of a heat-resistant fiber based on the total weight of the nonwoven fabric in a binder solution; b) forming a surface layer by drying the nonwoven fabric; c) stacking the surface layer on one side of a base layer formed of a conventional sound absorbing and insulating material; and d) molding the sound absorbing and insulating material at high temperature.

The step a-1) of forming the nonwoven fabric may include a needle punching process using a heat-resistant fiber. The sound-absorbing property may vary depending on the thickness and density of the nonwoven fabric. The sound-absorbing property may be improved as the thickness and density of the nonwoven fabric are increased.

The nonwoven fabric used in the present invention may have a thickness of about 3 to 20 mm when considering the industrial field and the like where the sound absorbing and insulating material is used. When the thickness of the nonwoven fabric is less than 3 mm, the durability and moldability of the sound absorbing and insulating material may be unsatisfactory. When the thickness of the nonwoven fabric is greater than about 20 mm, productivity may decrease and production cost may increase. Further, the density of the nonwoven fabric may be of about 100 to 2000 g/m$^2$, preferably of about 200 to 1200 g/m$^2$, more preferably of about 300 to 800 g/m$^2$, when considering performance and cost.

The aramid nonwoven fabric is formed by stacking a web of about 30 to 100 g/m$^2$ formed by carding two—to 12-fold and continuously performing up-down preneedling, down-up needling and up-down needling, thereby forming physical bridges that provide the necessary thickness, binding strength and other desired physical properties. The needle used to perform the needling may be a barb-type needle, having a working blade of about 0.5 to 3 mm and a needle length (the distance from crank outside to point) of about 70 to 120 mm Preferably, the needle stroke may be of about 30 to 350 times/m$^2$.

The fineness of yarn for the nonwoven fabric suitably may be of about 1.5 to 8.0 denier, the thickness of the pile layer may be of about 6 to 13 mm, the needle stroke may be of about 120 to 250 times/m$^2$, and the density of the nonwoven fabric may be of about 300 to 800 g/m$^2$.

The internal structure of the sound absorbing and insulating material manufactured by the method described above may be confirmed using an electron microscope. When observed with an electron microscope, the sound absorbing and insulating material of the present invention may have the micro cavities having a size of about 1 100 μm distributed inside thereof. The micro cavities may be distributed regularly or irregularly with a spacing of about 0.1 to 500 μm.

In another aspect, the present invention provides a method for reducing noise of a noise-generating device, including: i) checking a three-dimensional shape of a noise-generating device; ii) preparing and molding a sound absorbing and insulating material so as to correspond to the three-dimensional shape of the device partially or entirely; and iii) bringing the sound absorbing and insulating material adjacent to the noise-generating device.

The device refers to a noise-generating device including a motor, an engine, an exhaust system and the like. However, the scope of the device is not limited to the motor, engine and exhaust system. The sound absorbing and insulating material may be manufactured to correspond to the three-dimensional shape of the device partially or entirely. Since the sound absorbing and insulating material of the present invention is moldable during curing of the binder, the sound absorbing and insulating material may be molded to correspond to the three-dimensional shape of the device partially or entirely.

The expression "adjacent" means closely attaching the sound absorbing and insulating material to the noise-generating device, providing it with a distance from the noise-generating device, or molding it as a part of the noise-generating device. The expression adjacent also includes mounting the sound absorbing and insulating material to a member connected to the noise-generating device (e.g., another sound absorbing and insulating material).

FIGS. 3A-3B and FIGS. 4A-4B schematically show representative examples wherein the sound absorbing and insulating material of the present invention is applied to a noise-generating device of a vehicle.

Figure 3A:
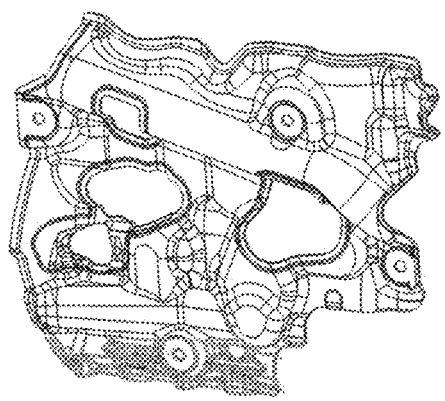
FIGS. 3A-3B schematically show an example of an exemplary sound absorbing and insulating material applied to an exemplary noise-generating device of a vehicle after molding as a part.
Figure 3B:
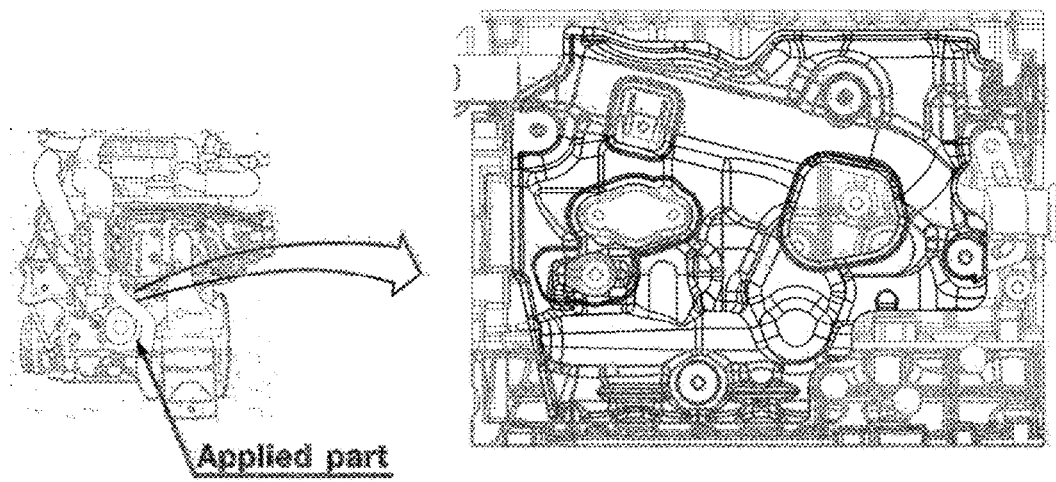

FIGS. 3A-3B schematically shows an exemplary sound absorbing and insulating material molded as a part and applied to a noise-generating device of a vehicle. FIG. 3A shows an exemplary sound absorbing and insulating material molded to be used in a vehicle engine, and FIG. 3B shows an exemplary sound absorbing and insulating material is applied in a part of a vehicle engine.

Figure 4A:
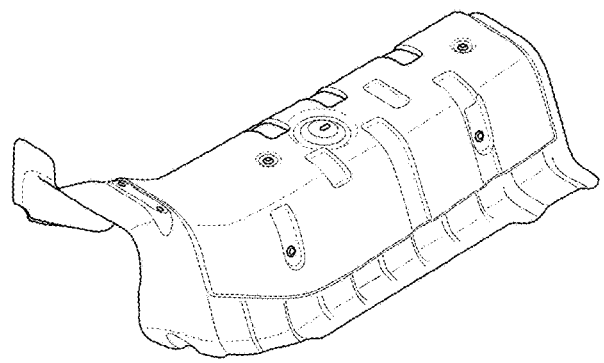
FIGS. 4A-4B schematically shows an example wherein an exemplary sound absorbing and insulating material is applied to noise-generating device of a vehicle with some distance.
Figure 4B:
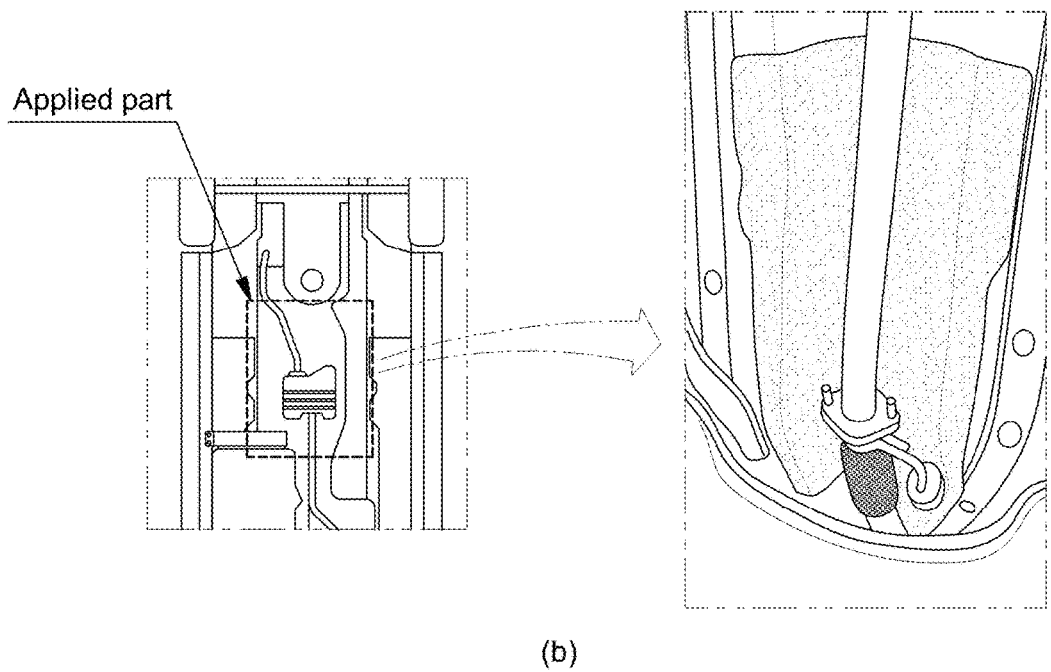

FIGS. 4A-4B schematically shows an example wherein a sound absorbing and insulating material is applied to a noise-generating device of a vehicle. FIG. 4A shows an exemplary sound absorbing and insulating material molded to be used in a lower part of a vehicle, and FIG. 4B shows an exemplary sound absorbing and insulating material attached to a lower part of a vehicle.

As described above, the sound absorbing and insulating material of the present invention may include the surface layer formed of the binder-impregnated nonwoven fabric. In particular, the binder may be impregnated to maintain the three-dimensional structure in the surface layer. The surface layer may be stacked on one side of the conventional sound absorbing and insulating material, may have improved sound-absorbing property, flame retardancy, heat-insulating property and heat resistance and can exhibit the desired sound-absorbing performance without deformation when directly applied to a noise-generating device maintained at high temperatures of 200° C. or greater.

EXAMPLES

Hereinafter, the present invention is described in more detail through examples. However, the scope of the present invention is not limited by the examples.

Preparation of Sound Absorbing and Insulating Material

Example 1. Preparation of Sound Absorbing and Insulating Material

1) Preparation of Surface Layer Formed of Epoxy Resin-Impregnated Aramid Nonwoven Fabric A meta-aramid short fiber having a limiting oxygen index (LOI) of 40%, a heat resistance temperature of 300° C., a fineness of 2 denier and a length of 51 mm was air blown and formed into a web of 30 g/m² through carding. The web was stacked by overlapping 10-fold on a conveyor belt operated at 5 m/min using a horizontal wrapper. An aramid nonwoven fabric having a density of 300 g/m² and a thickness of 6 mm was prepared by continuously performing up-down needling, down-up needling and up-down needling with a needle stroke of 150 times/m².

The prepared nonwoven fabric was immersed in a binder solution with 1 dip 1 nip (pick-up 300%). The binder solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate, based on the total weight of the binder solution.

The nonwoven fabric was taken out from the binder solution and dried at a temperature of 150° C. The dried nonwoven fabric contained 50 parts by weight of a binder based on 100 parts by weight of the nonwoven fabric.

2) Preparation of Sound Absorbing and Insulating Material wherein Surface Layer is Stacked on Base Layer After sequentially stacking a polyethylene nonwoven fabric having a density of 100 g/m² and a glass wool having a density of 700 g/m², the 6-mm thick surface layer prepared in 1) was stacked thereon. Then, a sound absorbing and insulating material was prepared by thermal molding for 2 minutes in a mold of a desired shape at a temperature of 250° C. by compressing at a pressure of 8 kgf/cm².

Comparative Example 1. Preparation of Sound Absorbing and Insulating Material Formed of Aramid Nonwoven Fabric An aramid nonwoven fabric having a density of 300 g/m² and a thickness of 6 mm was prepared by needle punching as described in Example 1 for use as a sound absorbing and insulating material.

Comparative Example 2. Preparation of Sound Absorbing and Insulating Material Formed of Epoxy Resin-Coated Aramid Nonwoven Fabric An aramid nonwoven fabric having a density of 300 g/m² and a thickness of 6 mm was prepared by needle punching as described in Example 1. Subsequently, a coating solution containing an epoxy resin was coated on the surface of the nonwoven fabric so that the content of a binder was 50 parts by weight based on 100 parts by weight of the nonwoven fabric. Then, the nonwoven fabric was molded after drying at a temperature of 150° C.

The coating solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate.

Comparative Example 3. Preparation of Sound Absorbing and Insulating Material Formed of Thermoplastic Resin-Impregnated Aramid Nonwoven Fabric An aramid nonwoven fabric having a density of 300 g/m² and a thickness of 6 mm was prepared by needle punching as described in Example 1. The nonwoven fabric was immersed in a binder solution, dried and then molded.

The binder solution was a thermoplastic resin solution containing 10 wt % of polyethylene resin, 10 wt % of melamine cyanurate and 80 wt % of dimethyl carbonate (DMC).

Comparative Example 4. Preparation of Sound Absorbing and Insulating Material Formed of Epoxy Resin-Impregnated PET Nonwoven Fabric A polyethylene terephthalate (PET) nonwoven fabric having a density of 300 g/m² and a thickness of 6 mm was prepared by needle punching as described in Example 1. The nonwoven fabric was immersed in a binder solution, dried and then molded.

The PET nonwoven fabric prepared in Comparative Example 4 was thermally deformed due to the reaction heat produced during the curing of epoxy and could not be molded into a desired shape because it was completely thermally deformed during the drying and thermal molding processes.

Test Methods: Evaluation of physical properties of sound absorbing and insulating materials The physical properties of the sound absorbing and insulating materials were measured and compared as follows.

1. Evaluation of Heat Resistance

To evaluate heat resistance, the sound absorbing and insulating material was aged in an oven at a temperature of 260° C. for 300 hours. After keeping at standard state (temperature 23±2° C., 50±5% relative humidity) for at least 1 hour, appearance was inspected and tensile strength was measured. It was visually inspected whether there were shrinkage or deformation, surface peeling, fluffing and cracking. The tensile strength was measured using a dumbbell-type No. 1 for randomly selected five sheets of test samples at a speed of 200 mm/min under a standard condition.

2. Evaluation of Thermal Cycle

The durability of the sound absorbing and insulating material was evaluated by the thermal cycle test method. The durability was determined after performing five cycles under the following conditions.

1) Condition of One Cycle

Room temperature→high temperature (150° C.×3 hr)→room temperature→low temperature (−30° C.×3 hr)→room temperature→humid condition (50° C.×95% RH).

2) Durability Evaluation Standard

After the thermal cycle test, the change in appearance was inspected. For example, surface damage, swelling, breaking and discoloring were inspected. If there was no change in appearance, the sound absorbing and insulating material was evaluated as 'no abnormality'.

3. Evaluation of Flame Retardancy

The flame retardancy of the sound absorbing and insulating material was measured according to the ISO 3795 flammability test method.

4. Evaluation of Nonflammability

The nonflammability of the sound absorbing and insulating material was measured according to the UL94 vertical burn test.

5. Evaluation of Sound-Absorbing Property

The sound-absorbing property of the sound absorbing and insulating material was measured according to the ISO 354 method.

6. Evaluation of Air Permeability

1) Evaluation Method

The test sample was mounted on a Frazier-type tester and the amount of air flowing through the sample vertically was measured. The area of the test sample through which the air passed was 5 cm² and the applied pressure was set to 125 pascal (Pa).

Test Example 1. Comparison of Properties of Sound Absorbing and Insulating Materials Depending on Heat-Resistant Fibers In Test Example 1, the physical properties of sound absorbing and insulating materials prepared with different heat-resistant fiber yarns were compared. Sound absorbing and insulating materials were prepared as described in Example 1 by preparing a surface layer and a base layer, stacking them and then molding. The nonwoven fabrics used to prepare the surface layer were prepared using yarns having a fineness of 2 denier and a length of 51 mm, which are described in Table 1. The physical properties of the prepared sound absorbing and insulating materials were measured as described above. The result of measuring the properties of the sound absorbing and insulating materials prepared with different heat-resistant fibers is shown in Table 1 and Table 2.

TABLE 1

Physical properties of sound absorbing and insulating materials

| | | Yarn 1 | Yarn 2 | Yarn 3 | Yarn 4 | Yarn 5 | Yarn 6 | Yarn 7 |
|---|---|---|---|---|---|---|---|---|
| Yarn | Yarn material | Aramid | PPS | PI | PBI | PBO | oxi-PAN | PK |
| | Limiting oxygen index | 40 | 30 | 50 | 40 | 60 | 65 | 30 |
| | Heat resistance temperature (° C. × 1 hr) | 300 | 230 | 300 | 300 | 300 | 300 | 300 |
| Heat resistance | Appearance | No abnormality | No abnormality | No abnormality | No abnormality | No abnormality | No abnormality | No abnormality |
| | Tensile | 200 | 180 | 220 | 200 | 210 | 210 | 200 |

TABLE 1-continued

Physical properties of sound absorbing and insulating materials

| | | Yarn 1 | Yarn 2 | Yarn 3 | Yarn 4 | Yarn 5 | Yarn 6 | Yarn 7 |
|---|---|---|---|---|---|---|---|---|
| | strength (Kgf/cm$^2$) | | | | | | | |
| Thermal cycle | Appearance | No abnormality | No abnormality | No abnormality | No abnormality | No abnormality | No abnormality | No abnormality |
| | Flame retardancy | Self-extinguishing | Self-extinguishing | Self-extinguishing | Self-extinguishing | Self-extinguishing | Self-extinguishing | Self-extinguishing |
| | Nonflammability | Nonflammable | Nonflammable | Nonflammable | Nonflammable | Nonflammable | Nonflammable | Nonflammable |

TABLE 2

Sound-absorbing rate of sound absorbing and insulating materials

| Frequency (Hz) | Yarn 1 (aramid) | Yarn 2 (PPS) | Yarn 6 (oxi-PAN) | Yarn 7 (PK) | Base layer* |
|---|---|---|---|---|---|
| 400 | 0.08 | 0.05 | 0.08 | 0.05 | 0.08 |
| 500 | 0.10 | 0.06 | 0.09 | 0.06 | 0.09 |
| 630 | 0.16 | 0.09 | 0.13 | 0.08 | 0.18 |
| 800 | 0.23 | 0.15 | 0.22 | 0.19 | 0.25 |
| 1000 | 0.35 | 0.30 | 0.35 | 0.26 | 0.39 |
| 1250 | 0.44 | 0.39 | 0.45 | 0.37 | 0.52 |
| 1600 | 0.59 | 0.49 | 0.57 | 0.31 | 0.66 |
| 2000 | 0.70 | 0.66 | 0.68 | 0.48 | 0.74 |
| 2500 | 0.79 | 0.71 | 0.80 | 0.67 | 0.79 |
| 3150 | 0.83 | 0.80 | 0.85 | 0.78 | 0.83 |
| 4000 | 0.86 | 0.83 | 0.88 | 0.84 | 0.89 |
| 5000 | 0.99 | 0.95 | 0.92 | 0.83 | 0.96 |
| 6300 | 0.98 | 0.96 | 0.98 | 0.89 | 0.97 |
| 8000 | 0.99 | 0.95 | 0.89 | 0.95 | 0.98 |
| 10000 | 0.98 | 0.97 | 0.99 | 0.95 | 0.95 |

*Base layer: the base layer used in 2) of Example 1; prepared by stacking a glass wool having a density of 700 g/m$^2$ and a polyethylene nonwoven fabric having a density of 100 g/m$^2$; thickness = 10 mm.

As seen from Table 1 and Table 2, all the sound absorbing and insulating materials prepared using heat-resistant fibers having a limiting oxygen index of 25% or greater and a heat resistance temperature of 150° C. or greater as presented by the present invention exhibited satisfactory heat resistance, durability, flame retardancy, nonflammability and sound-absorbing property. Accordingly, it was confirmed that conventional heat-resistant fibers known as super fiber can be used as the material of the nonwoven fabric of the sound absorbing and insulating material according to the present invention.

Test Example 2. Comparison of Properties of Sound Absorbing and Insulating Materials Depending on Density of Nonwoven Fabric In Test Example 2, sound absorbing and insulating materials were prepared in the same manner as in Example 1 using nonwoven fabrics having different densities in surface layers. The sound-absorbing performance of the prepared sound absorbing and insulating materials is shown in FIG. 5.

Figure 5:
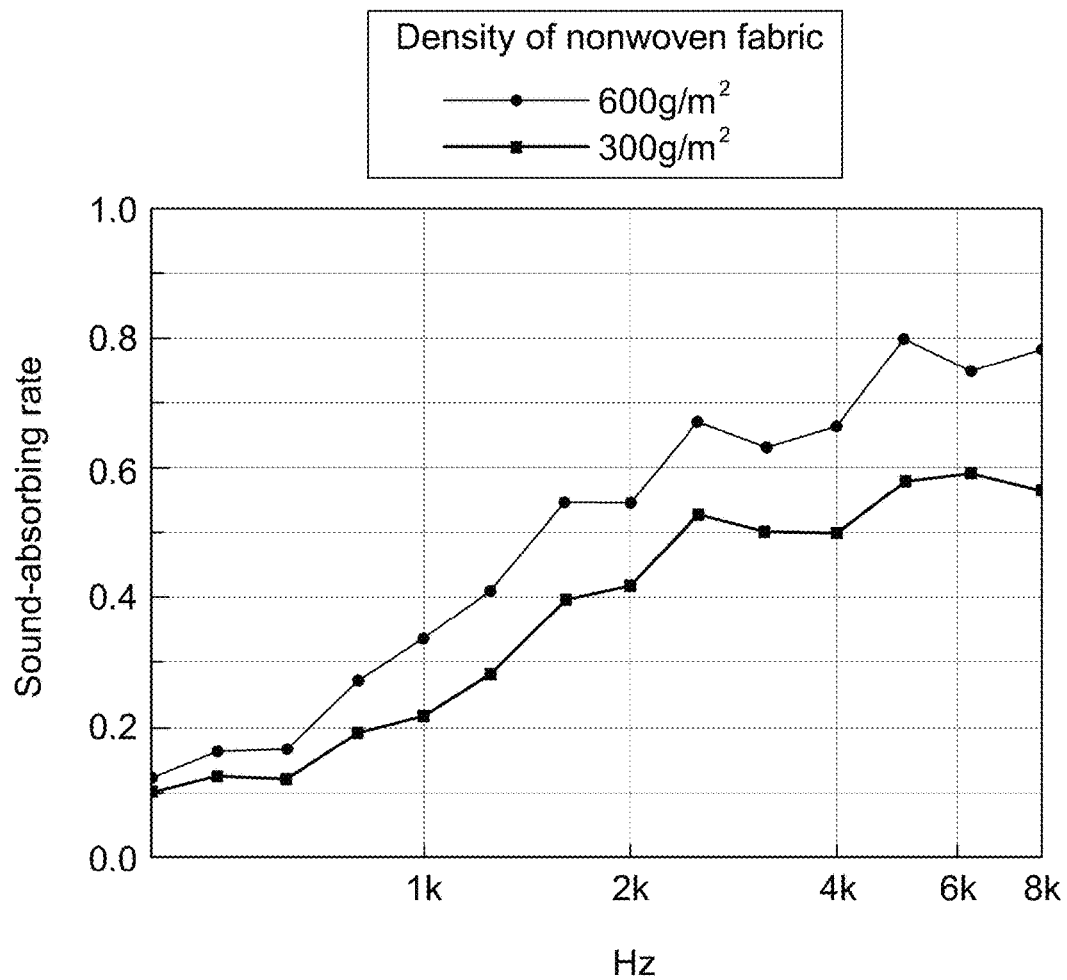
FIG. 5 is a graph comparing sound-absorbing performance of an exemplary surface layer depending on the density of a nonwoven fabric.

As seen from FIG. 5, the sound-absorbing performance of the sound absorbing and insulating material was superior when a nonwoven fabric having a density of 600 g/m$^2$ was used than when a nonwoven fabric having a density of 300 g/m$^2$ was used.

Test Example 3. Evaluation of Physical Properties of Sound Absorbing and Insulating Materials In Test Example 3, the properties of sound absorbing and insulating materials depending on the method by which a thermosetting binder was applied to a nonwoven fabric used in a surface layer were compared.

That is to say, the sound-absorbing rate of the sound absorbing and insulating materials prepared by impregnating (Example 1) and coating (Comparative Example 2) the thermosetting binder was compared. The result of measuring the sound-absorbing rate of the sound absorbing and insulating material formed of a nonwoven fabric (Comparative Example 1), the sound absorbing and insulating material on which the thermosetting binder was coated (Comparative Example 2), the sound absorbing and insulating material wherein the thermosetting binder was impregnated into the nonwoven fabric (surface layer of Example 1) and the sound absorbing and insulating material wherein a nonwoven fabric impregnated with the thermosetting binder was stacked as a surface layer (sound absorbing and insulating material of Example 1) is shown in Table 3.

TABLE 3

Sound-absorbing rate

| Frequency (Hz) | Comparative Example 1 | Comparative Example 2 | Surface layer of Example 1 | Sound absorbing and insulating material of Example 1 |
|---|---|---|---|---|
| 400 | 0.01 | 0.02 | 0.08 | 0.10 |
| 500 | 0.03 | 0.03 | 0.10 | 0.14 |
| 630 | 0.12 | 0.05 | 0.16 | 0.19 |
| 800 | 0.16 | 0.08 | 0.23 | 0.32 |
| 1000 | 0.26 | 0.12 | 0.35 | 0.52 |
| 1250 | 0.32 | 0.15 | 0.44 | 0.69 |
| 1600 | 0.39 | 0.22 | 0.59 | 0.72 |
| 2000 | 0.48 | 0.29 | 0.70 | 0.77 |
| 2500 | 0.64 | 0.40 | 0.79 | 0.78 |
| 3150 | 0.63 | 0.57 | 0.83 | 0.84 |
| 4000 | 0.72 | 0.68 | 0.86 | 0.88 |
| 5000 | 0.80 | 0.77 | 0.99 | 0.99 |
| 6300 | 0.78 | 0.82 | 0.98 | 0.99 |
| 8000 | 0.89 | 0.98 | 0.99 | 0.99 |
| 10000 | 0.90 | 0.98 | 0.98 | 0.99 |

The sound absorbing and insulating material presented by the present invention has a structure in which the thermosetting binder-impregnated nonwoven fabric is stacked as the surface layer on the base layer formed of a conventional sound absorbing and insulating material. As seen from Table 3, the sound absorbing and insulating material according to the present invention showed superior sound-absorbing rate in all frequency ranges as compared to Comparative Example 1 (nonwoven fabric) and Comparative Example 2 (binder-coated nonwoven fabric). From Table 3, it can be seen that the thermosetting binder-impregnated nonwoven fabric layer (corresponding to the surface layer of the sound absorbing and insulating material of the present invention) shows superior sound-absorbing effect as compared to Comparative Example 1 and Comparative Example 2 and the sound-absorbing effect is remarkably improved when it is stacked on the base layer (conventional sound absorbing and insulating material).

In contrast, the sound absorbing and insulating material of Comparative Example 2 wherein the nonwoven fabric on which the thermosetting binder was coated was used showed lower sound-absorbing rate than the nonwoven fabric (Comparative Example 1) in the frequency range of 400-5000 Hz.

Test Example 4. Evaluation of Heat-Insulating Performance of Sound Absorbing and Insulating Materials In Test Example 4, the heat-insulating performance of the surface layer of Example 1 (binder-impregnated aramid nonwoven fabric) and the sound absorbing and insulating materials prepared in Comparative Example 1 (aramid nonwoven fabric) and Comparative Example 3 (thermoplastic resin-impregnated aramid nonwoven fabric) was evaluated. After applying heat at a temperature of 1000° C. from one side of a 25-mm thick sample of each sound absorbing and insulating material for 5 minutes, temperature was measured on the opposite side of the sample.

The temperature measured on the opposite side of the sound absorbing and insulating material was at a temperature of 250° C. for the surface layer of Example 1 and at a temperature of 350° C. for the sound absorbing and insulating material of Comparative Example 1. Accordingly, it was confirmed that the sound absorbing and insulating material of the present invention wherein the thermosetting resin was impregnated exhibits improved heat-insulating performance. In contrast, the thermoplastic resin-impregnated sound absorbing and insulating material of Comparative Example 3 melted down and deformed as soon as the heat at a temperature of 1000° C. was applied.

Accordingly, it can be seen that the sound absorbing and insulating material of the present invention has very superior heat-insulating property.

Test Example 5. Comparison of Heat-Insulating Performance with Aluminum Heat-Insulating Plate In Test Example 5, the heat-insulating performance of the sound absorbing and insulating material of Example 1 was compared with that of an aluminum heat-insulating plate. While applying the same heat from one side of the sound absorbing and insulating material and the heat-insulating plate at a temperature of 250° C., the temperature at the opposite side was measured with time. The result is shown in FIG. 6.

Figure 6:
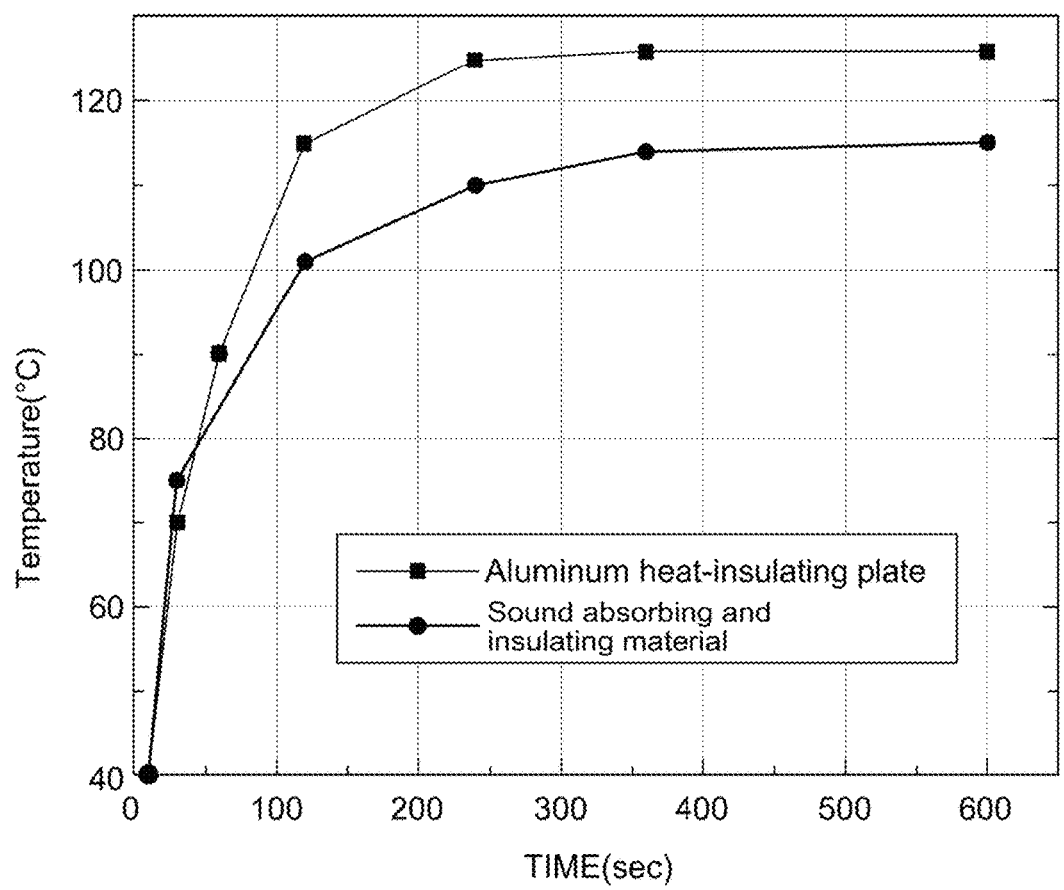
FIG. 6 is a graph comparing heat-insulating performance between an aluminum heat-insulating plate and an exemplary sound absorbing and insulating material of the present invention.

As seen from FIG. 6, the sound absorbing and insulating material according to the present invention showed better heat-insulating performance with the heat resistance temperature at least 11° C. lower as compared to the aluminum heat-insulating plate.

Test Example 6. Comparison of Properties of Sound Absorbing and Insulating Material Depending on Binder Content Surface layers of sound absorbing and insulating materials were prepared in the same manner as in Example 1. The epoxy resin-impregnated aramid nonwoven fabric was dried to have different final binder contents. The binder content was represented as parts by weight of the binder included in the sound absorbing and insulating material based on 100 parts by weight of the dried nonwoven fabric.

The result of comparing the mechanical properties and sound-absorbing rate of the sound absorbing and insulating materials prepared with different binder contents is shown in Table 4 and Table 5.

TABLE 4

Physical properties of sound absorbing and surface layers with different binder contents
Binder content (parts by weight)

| | 0 | 10 | 50 | 100 | 200 |
|---|---|---|---|---|---|
| Air permeability (mL/cm$^2$ · s) | 500 | 380 | 350 | 320 | 210 |
| Tensile strength (kg/cm$^2$) | 40 | 60 | 200 | 240 | 310 |
| Nonflammability | Nonflammable | Nonflammable | Nonflammable | Nonflammable | Nonflammable |

TABLE 5

Sound-absorbing rate of surface layers with different binder contents

| Frequency (Hz) | 0 parts by weight | 10 parts by weight | 50 parts by weight | 100 parts by weight | 200 parts by weight |
|---|---|---|---|---|---|
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.23 | 0.25 | 0.11 |
| 1000 | 0.26 | 0.26 | 0.35 | 0.30 | 0.14 |
| 1250 | 0.32 | 0.34 | 0.44 | 0.42 | 0.17 |
| 1600 | 0.39 | 0.41 | 0.59 | 0.54 | 0.22 |
| 2000 | 0.48 | 0.55 | 0.70 | 0.58 | 0.35 |
| 2500 | 0.64 | 0.68 | 0.79 | 0.67 | 0.44 |
| 3150 | 0.63 | 0.69 | 0.83 | 0.72 | 0.52 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.90 | 0.70 |
| 10000 | 0.90 | 0.92 | 0.98 | 0.92 | 0.71 |

As seen from Table 4 and Table 5, the sound-absorbing rate was improved as the binder was impregnated into the nonwoven fabric when compared with the nonwoven fabric not impregnated with the binder. Also, it was confirmed that the sound-absorbing rate of the sound absorbing and insulating material could be controlled with the binder content.

Test Example 7. Comparison of Properties of Sound Absorbing and Insulating Material Depending on Binders Surface layers of sound absorbing and insulating materials wherein 50 parts by weight of a binder was impregnated based on 100 parts by weight of an aramid nonwoven fabric were prepared in the same manner as in Example 1. The resins described in Table 6 were used as the binder.

The result of comparing the mechanical properties and sound-absorbing rate of the surface layers of the sound absorbing and insulating materials prepared with different binders is shown in Table 6.

TABLE 6

Physical properties of sound absorbing and insulating materials with different binders

| | Binder resin | | | | |
|---|---|---|---|---|---|
| | Epoxy | Phenol | Urea | Melamine | Polyurethane |
| Heat resistance temperature (° C. × 1 hr) | 300 | 260 | 190 | 300 | 200 |
| Tensile strength (kg/cm$^2$) | 200 | 165 | 180 | 180 | 170 |
| Flame retardancy | Self-extinguishing | Self-extinguishing | Self-extinguishing | Self-extinguishing | Self-extinguishing |
| Nonflammability | Nonflammable | Nonflammable | Nonflammable | Nonflammable | Nonflammable |

What is claimed is:

1. A sound absorbing and insulating material comprising:
   a base layer; and
   a surface layer comprising a nonwoven fabric comprising an amount of about 30 to 100 wt % of a heat-resistant fiber based on the total weight of the nonwoven fabric and a binder present in the same layer as the nonwoven fabric and maintaining a three-dimensional structure in the surface layer,
   wherein the surface layer is stacked on one side of the base layer.

2. The sound absorbing and insulating material according to claim 1, wherein the base layer and the surface layer is stacked by an adhesive, heat or pressure.

3. The sound absorbing and insulating material according to claim 2, wherein the adhesive is the same binder included in the surface layer.

4. The sound absorbing and insulating material according to claim 3, wherein the adhesive is a thermosetting resin.

5. The sound absorbing and insulating material according to claim 1, wherein the base layer or the surface layer is formed in a single layer or multiple layers.

6. The sound absorbing and insulating material according to claim 5, wherein the base layer has a thickness of about 5 to 50 mm and the surface layer has a thickness of about 0.1 to 5 mm.

7. The sound absorbing and insulating material according to claim 1, wherein the base layer is at least one material selected from a group consisting of a polyethylene terephthalate fiber, a polypropylene fiber, a polyethylene fiber, a polyamide fiber, a glass wool, a polyurethane fiber and a melamine fiber.

8. The sound absorbing and insulating material according to claim 1, wherein the nonwoven fabric of the surface layer has a density of about 100 to 2000 g/m$^2$.

9. The sound absorbing and insulating material according to claim 1, wherein the heat-resistant fiber of the nonwoven fabric has a limiting oxygen index (LOI) of about 25% or greater and a heat resistance temperature of about 150° C. or greater.

10. The sound absorbing and insulating material according to claim 9, wherein the heat-resistant fiber is one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber.

11. The sound absorbing and insulating material according to claim 10, wherein the heat-resistant fiber is an aramid fiber having a fineness of about 1 to 15 denier.

12. The sound absorbing and insulating material according to claim 1, wherein the binder included in the surface layer is a thermosetting resin.

13. The sound absorbing and insulating material according to claim 4, wherein the thermosetting resin is an epoxy resin.

14. The sound absorbing and insulating material according to claim 13, wherein the epoxy resin is one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

15. The sound absorbing and insulating material according to claim 1, wherein the sound absorbing and insulating material is molded to have a three-dimensional shape corresponding to that to which the sound absorbing and insulating material is applied.

16. The sound absorbing and insulating material according to claim 15, wherein the sound absorbing and insulating material is for a vehicle.

17. A method for manufacturing the sound absorbing and insulating material according to claim 1, comprising steps of:
   a) immersing a nonwoven fabric comprising an amount of about 30 to 100 wt % of a heat-resistant fiber based on the total weight of the nonwoven fabric in a binder solution;
   b) forming a surface layer by drying the nonwoven fabric; and
   c) stacking the surface layer on one side of a base layer.

18. The method according to claim 17, further comprising a step of, after the step c), d) molding the sound absorbing and insulating material.

19. The method according to claim 17, wherein in the step b), the nonwoven fabric is dried at a temperature of 70 about 200° C. and the surface layer formed after drying comprises an amount of about 1 to 300 parts by weight of a binder based on 100 parts by weight of the nonwoven fabric.

20. The method according to claim 17, wherein, in the step c), the surface layer and the base layer is stacked by an adhesive, heat or pressure.

21. The method according to claim 20, wherein the adhesive is the same binder included in the surface layer.

22. The method according to claim 21, wherein the adhesive is a thermosetting resin.

23. The method according to claim 17, wherein the base layer or the surface layer is formed in a single layer or multiple layers.

24. The method according to claim 17, wherein the base layer is at least one material selected from a group consisting of a polyethylene terephthalate fiber, a polypropylene fiber, a polyethylene fiber, a polyamide fiber, a glass wool, a polyurethane fiber and a melamine fiber.

25. The method according to claim 17, wherein the heat-resistant fiber constituting the nonwoven fabric has a limiting oxygen index (LOI) of about 25% or greater and a heat resistance temperature of about 150° C. or greater.

26. The method according to claim 25, wherein the heat-resistant fiber is one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber.

27. The method according to claim 26, wherein the heat-resistant fiber is an aramid fiber having a fineness of about 1 to 15 denier and a yarn length of about 20 to 100 mm.

28. The method according to claim 17, wherein the nonwoven fabric has a thickness of about 3 to 20 mm and a density of about 100 to 2000 g/m².

29. The method according to claim 17, wherein the nonwoven fabric is formed by continuously performing up-down needling, down-up needling and up-down needling.

30. The method according to claim 29, wherein the nonwoven fabric is formed with a needle stroke of about 30 to 350 times/m².

31. The method according to claim 17, wherein the binder solution comprises an amount of about 1 to 60 wt % of a binder, an amount of about 0.1 to 10 wt % of a curing agent, an amount of about 0.01 to 5 wt % of a catalyst, an amount of about 1 to 40 wt % of an additive and a solvent constituting the remaining balance of the binder solution, all the wt % based on the total weight of the binder solution.

32. The method according to claim 17, wherein the binder solution comprises an amount of about 1 to 30 wt % of the binder, an amount of about 0.1 to 10 wt % of a curing agent, an amount of about 0.01 to 5 wt % of a catalyst, an amount of about 1 to 30 wt % of a flame retardant and an amount of about 40 to 95 wt % of a solvent, all the wt % based on the total weight of the binder solution.

33. The method according to claim 31, wherein the binder is a thermosetting resin.

34. The method according to claim 22, wherein the thermosetting resin is an epoxy resin.

35. The method according to claim 34, wherein the epoxy resin is one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

36. The method according to claim 17, wherein the sound absorbing and insulating material is for a vehicle.

37. A method for reducing noise of a noise-generating device, comprising:
  i) checking a three-dimensional shape of a noise-generating device;
  ii) preparing and molding the sound absorbing and insulating material according to claim 1 so as to correspond to the three-dimensional shape of the device partially or entirely; and
  iii) bringing the sound absorbing and insulating material adjacent to the noise-generating device.

38. The method according to claim 37, wherein the device is a motor, an engine or an exhaust system.

39. The method according to claim 37, wherein the sound absorbing and insulating material is brought adjacent to the noise-generating device by attaching the sound absorbing and insulating material to the noise-generating device, providing the sound absorbing and insulating material with a distance from the noise-generating device, or molding the sound absorbing and insulating material as a part of the noise-generating device.

40. A vehicle comprising a sound absorbing and insulating material of claim 1.

* * * * *